US012700311B2

(12) United States Patent 
Sharma et al.

(10) Patent No.: US 12,700,311 B2 
(45) Date of Patent: Aug. 4, 2026

(54) OPTIMIZING PARKING LOCATIONS

(71) Applicant: GM Global Technology Operations LLC, Detroit, MI (US)

(72) Inventors: Manoj Kumar Sharma, Troy, MI (US); Donald K. Grimm, Utica, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 18/911,828

(22) Filed: Oct. 10, 2024

(65) Prior Publication Data

US 2026/0141807 A1 May 21, 2026

(51) Int. Cl. 
*G08G 1/14* (2006.01) 
*B60K 35/23* (2024.01) 
*B60K 35/28* (2024.01) 
*B60W 30/06* (2006.01)

(52) U.S. Cl. 
CPC ............. *G08G 1/143* (2013.01); *B60K 35/28* (2024.01); *B60W 30/06* (2013.01); *B60K 35/23* (2024.01); *B60K 2360/166* (2024.01); *B60K 2360/175* (2024.01); *B60W 2540/215* (2020.02); *B60W 2556/10* (2020.02)

(58) Field of Classification Search 
None 
See application file for complete search history.

(56) References Cited

U.S. PATENT DOCUMENTS 12,269,508 B1 * 4/2025 Funke .................. B60W 40/02 
2015/0123818 A1 5/2015 Sellschopp 
(Continued)

FOREIGN PATENT DOCUMENTS

CN 115410406 A * 11/2022 ............. G08G 1/143 
DE 102010040591 A1 3/2012 
(Continued)

OTHER PUBLICATIONS

Machine translation of Zhao et al. (CN-115410406-A) (Year: 2022).*

*Primary Examiner* — Navid Z. Mehdizadeh 
*Assistant Examiner* — Sarah A. Mueller 
(74) *Attorney, Agent, or Firm* — Vivacqua Crane, PLLC

(57) ABSTRACT

A method of selecting an optimized parking location includes presenting a list of parking preference options to a user, collecting parking preferences, identifying a destination and current location of the vehicle, collecting data from a plurality of sensors within the vehicle, collecting data from external sources and creating a list of potential parking spaces, filtering the list of potential parking space, collecting data related to environmental and contextual conditions, accessing a user model based on historical data of parking events, creating a filtered list of potential parking spaces, ranking each of the potential parking spaces; selecting a sub-set of potential parking spaces, displaying the sub-set of potential parking spaces to the user, receiving a selection of one of the displayed sub-set of potential parking spaces, and at least one of initiating autonomous travel to and parking within the selected parking space, and displaying directions to the selected parking space.

20 Claims, 5 Drawing Sheets

(56)                    References Cited

U.S. PATENT DOCUMENTS

| | | | | |
|---|---|---|---|---|
| 2016/0055749 | A1* | 2/2016 | Nicoll | G08G 1/096844 |
| | | | | 340/932.2 |
| 2019/0180621 | A1* | 6/2019 | Matsuda | B60R 21/00 |
| 2020/0062242 | A1* | 2/2020 | Hayakawa | B62D 15/0285 |
| 2021/0304606 | A1* | 9/2021 | Noguchi | G06V 20/593 |
| 2021/0372812 | A1* | 12/2021 | Schick | B62D 15/0285 |
| 2022/0274586 | A1* | 9/2022 | Tokuhiro | B60W 30/06 |
| 2023/0166725 | A1* | 6/2023 | Tsimhoni | B62D 15/0285 |
| 2025/0236283 | A1* | 7/2025 | Mohammed | G08G 1/145 |

FOREIGN PATENT DOCUMENTS

| | | | |
|---|---|---|---|
| DE | 102015113596 | A1 | 2/2016 |
| DE | 112017003677 | T5 | 4/2019 |
| DE | 102022106127 | A1 | 9/2023 |

* cited by examiner

OPTIMIZING PARKING LOCATIONS

INTRODUCTION

The present disclosure relates to a system and method for selecting optimized parking spaces based on a driver's preferences.

In-vehicle information systems have become commonplace in vehicles such as automobiles, trucks, sport utility vehicles, etc. In some instances, the information systems may be used to configure user preferences. For example, the information systems present options to the user and the user indicates their preferences by selecting one or more of the options.

A driver of a vehicle may experience anxiety and uncertainty when searching for an optimal parking spot due to lack of information about possible empty spaces that are available to them, and which may better satisfy their own preferences. Current automated driving systems do not include searching for and choosing a parking location adaptive to a user's preferences. Further, current automated driving systems do not explain their choices.

Thus, while current systems and methods achieve their intended purpose, there is a need for a new and improved system and method to select an optimal parking space by adapting selection of a parking space to a drivers' preferences and contextual information, interacting with the user regarding the selection of parking space, and explaining the reasoning behind parking space selections.

SUMMARY

According to several aspects of the present disclosure, a method of selecting an optimized parking location for a vehicle, includes, with a data processor of a system for selecting an optimized parking location within the vehicle, presenting, via a human machine interface (HMI), a list of parking preference options to a user within the vehicle, collecting, via the HMI, parking preferences for the user for each of the options presented in the list of parking preference options, identifying a destination of the vehicle, identifying a current location of the vehicle, collecting data from a plurality of sensors within the vehicle related to a number of passengers within the vehicle and cargo within the vehicle, collecting, via a wireless communication module within the vehicle, data from external sources and creating a list of potential parking spaces, filtering the list of potential parking spaces based on availability, collecting, via the wireless communication module within the vehicle, and sensors within the vehicle, data related to environmental and contextual conditions for each of the potential parking spaces, accessing, with the data processor, a user model based on historical data of parking events for the vehicle, further filtering the list of potential parking spaces based on user preferences, data related to environmental and contextual conditions, and the user model and creating a filtered list of potential parking spaces, ranking each of the potential parking spaces in the filtered list based on the parking preferences of the driver, the data related to environmental and contextual conditions, and the user model, selecting, from the filtered list of potential parking spaces, a sub-set of potential parking spaces based on rank, displaying, via the HMI, the sub-set of potential parking spaces to the user, receiving, from the user, via the HMI, a selection of one of the displayed sub-set of potential parking spaces, and, at least one of initiating, via communication with a vehicle controller, autonomous travel to and parking within the selected one of the sub-set of potential parking spaces, and displaying, via the HMI, directions to the selected one of the sub-set of potential parking spaces.

According to another aspect, the method further includes, upon arrival of the vehicle at the selected one of the sub-set of potential parking spaces, collecting, with the sensors within the vehicle, data related to environmental and contextual conditions at the selected one of the sub-set of potential parking spaces, re-ranking the list of filtered potential parking spaces and updating the sub-set of potential parking spaces, displaying, with the HMI, the updated sub-set of potential parking spaces; and receiving, from the user, via the HMI, one of a selection, by the user, to continue parking in the selected one of the sub-set of potential parking spaces, or a selection, of one of the displayed updated sub-set of potential parking spaces that the user now wishes to park within, and, at least one of initiating, via communication with a vehicle controller, autonomous travel to and parking within the selected one of the updated sub-set of potential parking spaces, and displaying, via the HMI, directions to the selected one of the updated sub-set of potential parking spaces.

According to another aspect, the method further includes, upon arrival of the vehicle at the selected one of the sub-set of potential parking spaces, receiving, from the user, via the HMI, a rejection of the selected one of the sub-set of potential parking spaces, prompting, with the HMI, an explanation for the rejection, and updating the user model based on rejection of the selected one of the sub-set of potential parking spaces and the explanation provided by the user.

According to another aspect, the collecting, with the data processor, via the HMI, parking preferences for the user for each of the options presented in the list of parking preference options further includes collecting, with the data processor, via the HMI, a ranking for each of the options presented in the list of parking preference options, and a classification for the user's preference for each of the options presented in the list of parking preference options.

According to another aspect, the displaying, via the HMI, the sub-set of potential parking spaces to the user further includes displaying, with a hybrid head-up-display system, upon an inner surface of a windshield of the vehicle, text and graphics adapted to identify and provide information related to the sub-set of potential parking spaces.

According to another aspect, the collecting, via the HMI, parking preferences for the user for each of the options presented in the list of parking preference options further includes receiving, from the user, via the HMI, a preference for the data processor to, when a destination for the vehicle has been identified, send instructions to the vehicle controller to automatically and autonomously, navigate the vehicle to a highest ranked one of the sub-set of potential parking spaces, and park the vehicle within the highest ranked one of the sub-set of potential parking spaces.

According to another aspect, the collecting, via the HMI, parking preferences for the user for each of the options presented in the list of parking preference options further includes receiving, from the user, via the HMI, a preference for the data processor to, when a destination for the vehicle has been identified and a selection of one of the sub-set of potential parking spaces has been received from the user, send instructions to the vehicle controller to automatically and autonomously, navigate the vehicle to the selected one of the sub-set of potential parking spaces, and park the vehicle within the selected one of the sub-set of potential parking spaces.

According to another aspect, the displaying, via the HMI, the sub-set of potential parking spaces to the user further includes displaying, with at least one of the HMI and the hybrid head-up-display system, explanations for the ranking of each of the displayed sub-set of potential parking spaces.

According to another aspect, the displaying, with at least one of the HMI and the hybrid head-up-display system, explanations for the ranking of each of the displayed sub-set of potential parking spaces further includes displaying a comparison of parking characteristics of each of the sub-set of potential parking spaces to user preferences.

According to another aspect, the method further includes collecting, via the wireless communication module within the vehicle, data from external sources related to availability of parking spaces within a parking structure at the identified destination, and, one of determining, with the data processor, based on the user model, that the identified destination is familiar to the user, and displaying a sub-set of potential parking spaces to the user only when the number of available parking spaces at the parking structure at the destination is less than a first pre-determined threshold, or determining, with the data processor, based on the user model, that the identified destination is un-familiar to the user, and displaying a sub-set of potential parking spaces to the user only when the number of available parking spaces at the parking structure at the destination is less than a second pre-determined threshold.

According to another aspect, the method further includes updating, with the data processor, the user model based on Inputs, from the user, collected by the data processor, via the HMI, selection, by the user, of one of the sub-set of potential parking spaces, rejection, by the user, of a selected one of the sub-set of potential parking spaces by a user, and completion of parking within the selected one of the sub-set of potential parking spaces.

According to another aspect, the method further includes repeating the creating a filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle has parked.

According to several aspects of the present disclosure, a system for selecting an optimized parking location for a vehicle incudes a data processor adapted to control the system, a human machine interface (HMI) adapted to present a list of parking preference options to a user within the vehicle and to collect, from the user, parking preferences for the user for each of the options presented in the list of parking preference options, the data processor further adapted to identifying a destination of the vehicle, identifying a current location of the vehicle, collect data from a plurality of sensors within the vehicle related to a number of passengers within the vehicle and cargo within the vehicle, collect, via a wireless communication module within the vehicle, data from external sources and create a list of potential parking spaces, filter the list of potential parking spaces based on availability, collect, via the wireless communication module within the vehicle, and the plurality of sensors within the vehicle, data related to environmental and contextual conditions for each of the potential parking spaces, access a user model based on historical data of parking events for the vehicle, further filter the list of potential parking spaces based on user preferences, data related to environmental and contextual conditions, and the user model and creating a filtered list of potential parking spaces, rank each of the potential parking spaces in the filtered list based on the parking preferences of the driver, the data related to environmental and contextual conditions, and the user model, select, from the filtered list of potential parking spaces, a sub-set of potential parking spaces based on rank, display, via the HMI, the sub-set of potential parking spaces to the user with an explanation for the rankings, receive, from the user, via the HMI, a selection of one of the displayed sub-set of potential parking spaces, and, at least one of initiate, via communication with a vehicle controller, autonomous travel to and parking within the selected one of the sub-set of potential parking spaces, and display, via the HMI, directions to the selected one of the sub-set of potential parking spaces, and repeat the creating a filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle has parked.

According to another aspect, upon arrival of the vehicle at the selected one of the sub-set of potential parking spaces, the data processor is further adapted to collect, with the plurality of sensors within the vehicle, data related to environmental and contextual conditions at the selected one of the sub-set of potential parking spaces, re-rank the list of filtered potential parking spaces and update the sub-set of potential parking spaces, display, with the HMI, the updated sub-set of potential parking spaces; and receive, from the user, via the HMI, one of a selection, by the user, to continue parking in the selected one of the sub-set of potential parking spaces, or a selection, by the user, of one of the displayed updated sub-set of potential parking spaces that the user now wishes to park within, and, at least one of initiate, via communication with the vehicle controller, autonomous travel to and parking within the selected one of the updated sub-set of potential parking spaces, and display, via the HMI, directions to the selected one of the updated sub-set of potential parking spaces.

According to another aspect, upon arrival of the vehicle at the selected one of the sub-set of potential parking spaces, the data processor is further adapted to receive, from the user, via the HMI, a rejection of the selected one of the sub-set of potential parking spaces, prompt, with the HMI, an explanation for the rejection, and update the user model based on rejection of the selected one of the sub-set of potential parking spaces and the explanation provided by the user.

According to another aspect, when collecting, via the HMI, parking preferences for the user for each of the options presented in the list of parking preference options, the data processor is further adapted to collect, with the data processor, via the HMI, a ranking for each of the options presented in the list of parking preference options, and a classification for the user's preference for each of the options presented in the list of parking preference options, and a preference for the data processor to one of when a destination for the vehicle has been identified, send instructions to the vehicle controller to automatically and autonomously navigate the vehicle to a highest ranked one of the sub-set of potential parking spaces, and park the vehicle within the highest ranked one of the sub-set of potential parking spaces, or when a destination for the vehicle has been identified and a selection of one of the sub-set of potential parking spaces has been received from the user, send instructions to the vehicle controller to automatically and autonomously navigate the vehicle to the selected one of the sub-set of potential parking spaces, and park the vehicle within the selected one of the sub-set of potential parking spaces.

According to another aspect, when displaying, via the HMI, the sub-set of potential parking spaces to the user, the data processor is further adapted to display, with a hybrid head-up-display system, upon an inner surface of a windshield of the vehicle, text and graphics adapted to identify and provide information related to the sub-set of potential parking spaces.

According to another aspect, the data processor is further adapted to collect, via the wireless communication module within the vehicle, data from external sources related to availability of parking spaces within a parking structure at the identified destination, and, one of determine, based on the user model, that the identified destination is familiar to the user, and display a sub-set of potential parking spaces to the user only when the number of available parking spaces at the parking structure at the destination is less than a first pre-determined threshold, or determine, based on the user model, that the identified destination is un-familiar to the user, and display a sub-set of potential parking spaces to the user only when the number of available parking spaces at the parking structure at the destination is less than a second pre-determined threshold.

According to another aspect, the data processor is further adapted to updated the user model based on inputs, from the user, collected by the data processor, via the HMI, selection, by the user, of one of the sub-set of potential parking spaces, rejection, by the user, of a selected one of the sub-set of potential parking spaces by a user, and completion of parking within the selected one of the sub-set of potential parking spaces.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
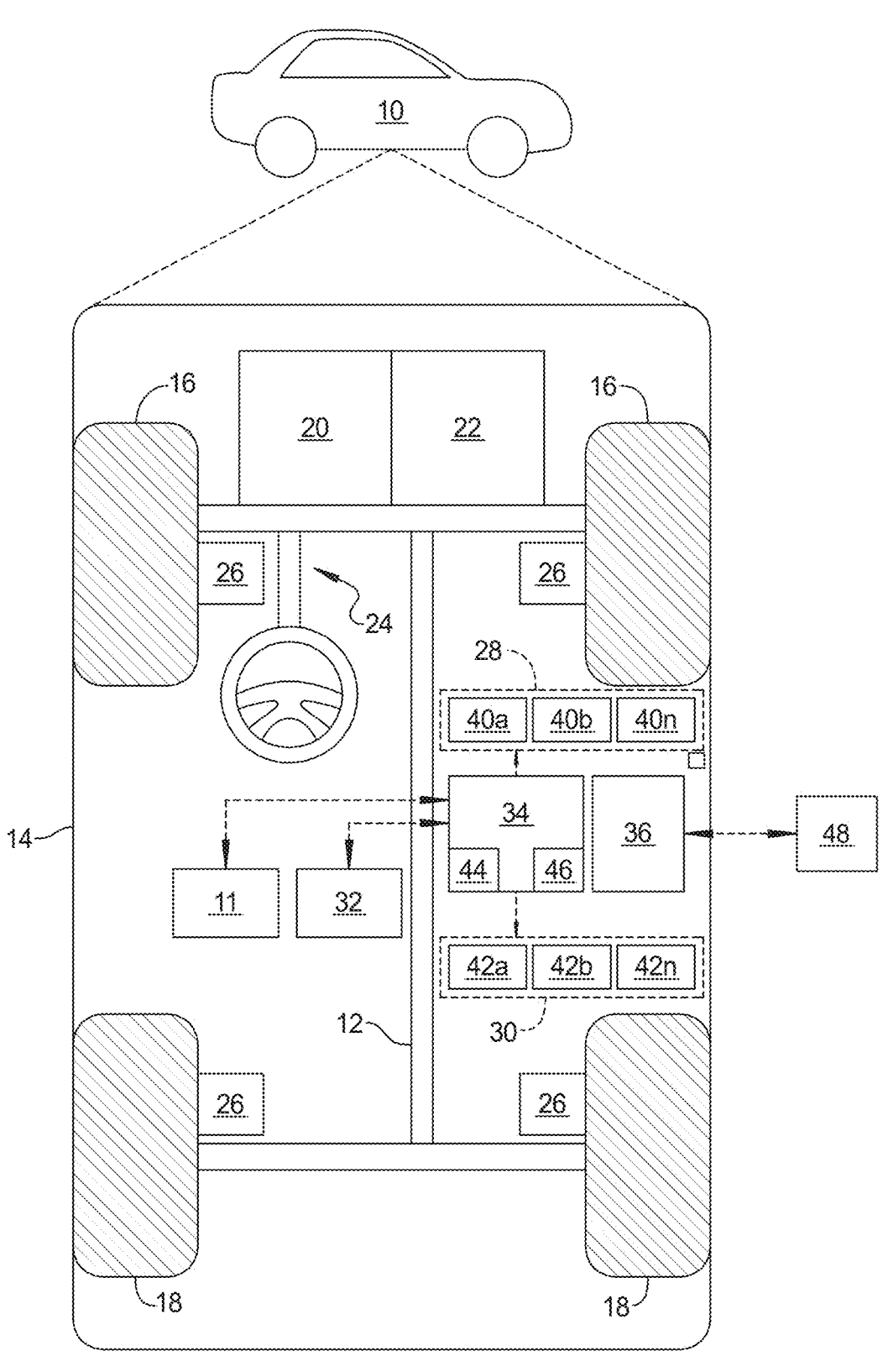
FIG. 1 is a schematic diagram of a vehicle including a system adapted to optimize parking selection for a user within the vehicle according to an exemplary embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: 4 (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated system 50 adapted to optimize parking selection for a user within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human user does not respond appropriately to a request to intervene. A Level Five system indicates "full automation", referring to the full-time performance by an automated driving system of all aspects of the dynamic driving task under all roadway and environmental conditions that can be managed by a human driver. The system 50 can be utilized to provide information to an autonomous vehicle controller for autonomous parking maneuvers. The novel aspects of the present disclosure are also applicable to non-autonomous vehicles, wherein the system provides identification of available parking spaces, information related to the identified parking spaces, and graphics/information adapted to assist the driver throughout a parking maneuver.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
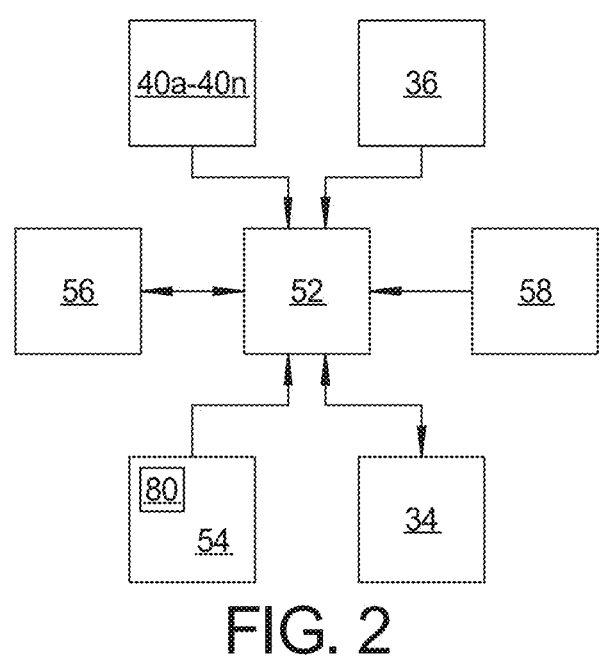
FIG. 2 is a schematic diagram of the system adapted to optimize parking selection for a user.

Referring to FIG. 2, the system 50 includes a data processor 52 in communication with the vehicle controller 34, the plurality of sensors 40a-40n, a database 54 and the wireless communication module 36. The system 50 also includes a human-machine interface (HMI) 56 in communication with the data processor 52 and adapted to display information to a user within the vehicle 10. The HMI 56 includes a touch screen which allows the user to input information to the data processor 52 via the HMI 56. In other embodiments, the HMI could also be associated with a speaker and/or cameras which allow a user within the vehicle 10 to provide input to the data processor 52 verbally or with gestures.

The system 50 further includes an augmented reality head up display system (AR-HUD) 58 in communication with the data processor 52 and adapted to project images onto an inner surface 60 of a windshield 62 of the vehicle 10. Images projected by the AR-HUD 58 are reflected, by the inner surface 60 of the windshield 62 to the eyes 66 of a user within the vehicle 10.

Figure 3:
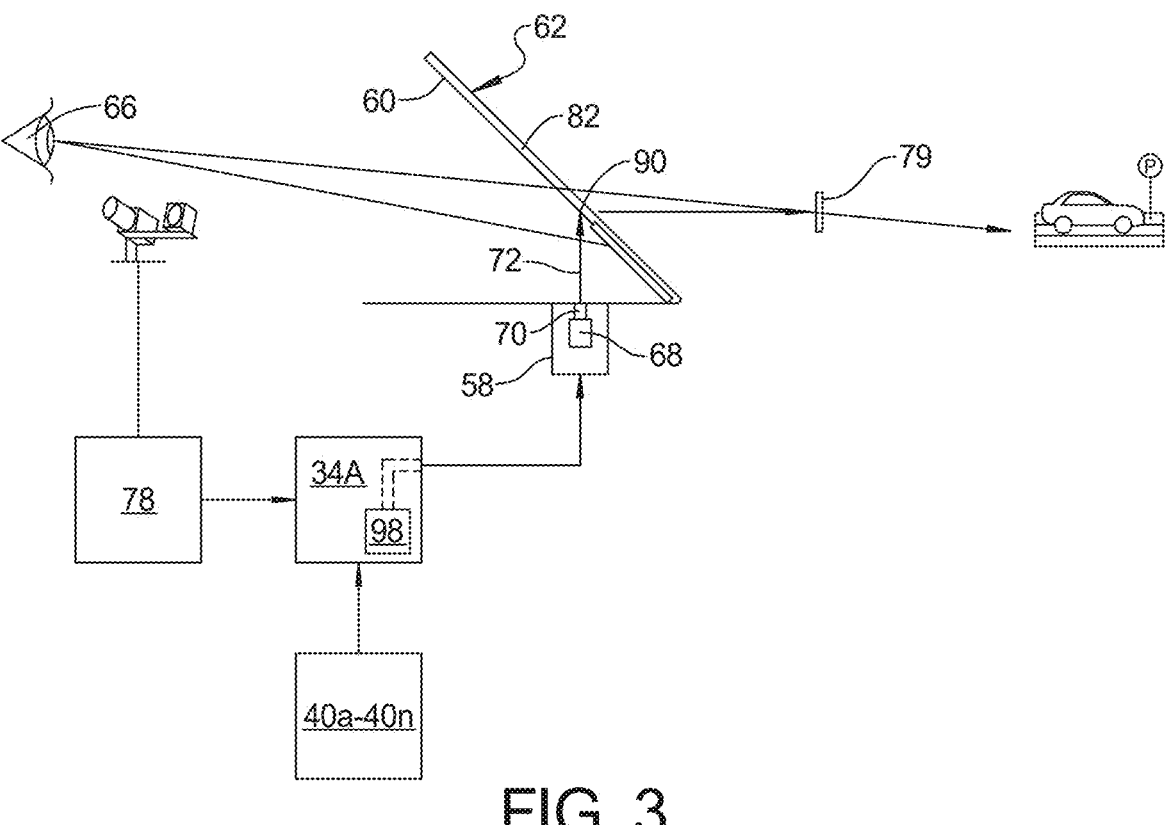
FIG. 3 is schematic diagram of a head-up-display system of the system for optimizing parking selection shown in FIG. 2.

Referring to FIG. 3, in an exemplary embodiment, the AR-HUD 58 includes a system controller 34A in communication with the data processor 52 and a projection module 68 including at least one light source 70 that is adapted to project an image upon the inner surface 60 of the windshield 62 of the vehicle 10. As described herein, the at least one light source 70 comprises a laser, however, it should be understood that the at least one light source 70 may be other known types of light sources used in head-up display systems. In an exemplary embodiment, the projection module 68 of the AR-HUD 58 is a holographic projection module and includes an exit pupil replicator. The holographic image is projected into the exit pupil replicator and then propagates inside the exit pupil replicator and is extracted multiple times before being projected upward to the inner surface 60 of the windshield 62, as indicated by arrow 72. The re-circulation of the light several times within the exit pupil replicator expands the pupil so the viewer can see the holographic image from an extended eye-box. In addition to expanding the eye-box, the exit pupil replicator also magnifies the original projected image coming out of the light source 70. A spatial light modulator is positioned between the light source 70 and the exit pupil replicator. The spatial light modulator is adapted to receive the light from the light source 70, to diffract the laser light with an encoded hologram and to deliver the diffracted laser to the exit pupil replicator. As shown and described herein, the AR-HUD 58 is a holographic head-up system, however, it should be understood that the novel features of the present disclosure are applicable to other head-up display configurations.

Figure 4:
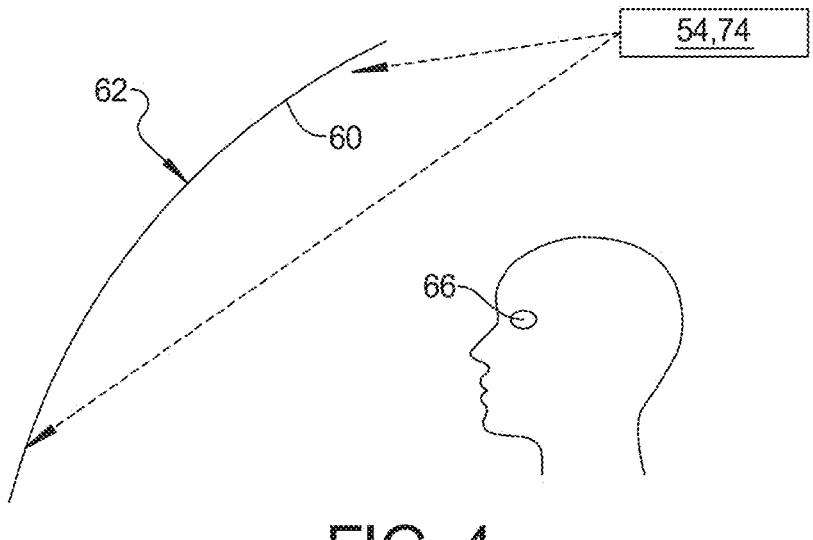
FIG. 4 is a schematic diagram illustrating how a head-up-display having a digital light projector displays images onto an inner surface of a windshield of the vehicle.

Referring to FIG. 4, in another exemplary embodiment, the AR-HUD 54 comprises a digital light projector (DLP) 74 adapted to project images onto the inner surface 60 of the windshield 62 of the vehicle 10. The DLP 74 includes a light source adapted to project an excitation light, a condensing lens adapted to focus the excitation light from the light source, a color filter (color wheel) adapted to split the focused excitation light into red, green and blue light, a shaping lens adapted to focus the excitation light passing through the color filter, a digital micro-mirror device (DMD) adapted to re-direct the excitation light, and a projection lens adapted to receive the excitation light from the DMD and project the excitation light to the inner surface 60 of the windshield 62.

The windshield 62 is equipped with features capable of displaying an image projected thereupon while remaining transparent or substantially transparent such that occupants of the vehicle 10 can clearly observe outside of the vehicle 10 through the windshield 58. It should be understood that, as depicted, the windshield 62 is in the front of the vehicle 10, other surfaces within the vehicle 10 could be used for projection, including side windows and a rear window. Additionally, the view on the front windshield 62 could be continued upon the front vehicle "A-pillars" and onto the side windows as a continuous image. The windshield 62 is both transparent and capable of displaying images projected by an excitation light. An occupant within the vehicle 10 is able to see an arbitrary object through a substrate positioned on the windshield 62. The substrate may be transparent or substantially transparent. While the occupant sees objects through the substrate, the occupant can also see images that are created at the substrate. The substrate may be part of the windshield 62, a glass substrate, a plastic substrate, a polymer substrate, or other transparent (or substantially transparent) medium that would be appreciated by one of ordinary skill in the art. Other substrates may complement the substrate to provide for tinting, substrate protection, light filtering (e.g. filtering external ultraviolet light), and other functions. The substrate receives excitation light from the light source. The received excitation light may be absorbed by light emitting material at the substrate. When the light emitting material receives the excitation light, the light emitting material emits visible light. Accordingly, images may be created at the substrate by selectively illuminating the substrate with excitation light.

In an exemplary embodiment, the light emitting material includes transparent phosphors that are embedded into the substrate. The transparent phosphors are light emitting particles which fluoresce in response to being excited by the excitation light. In an exemplary embodiment, the transparent phosphors are red, green, and blue (RGB) phosphors, allowing full color. The use of monochrome and/or two-color phosphors is also within the scope of the present disclosure. When excitation light is absorbed by the transparent phosphors, visible light is emitted by the transparent phosphors. The excitation light is provided by the light source. Use of the substrate and light emitting material to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

In an exemplary embodiment, the light source is a micro-mirror array (MMA) projector (e.g. a digital light processing (DLP) projector 74). In the DLP 74, images are created by microscopically small mirrors laid out in a matrix on a semiconductor chip within the DMD. An MMA projector that outputs ultraviolet light may be similar to an MMA projector that outputs visible light, except that the color filter has light filters that are tailored to the ultraviolet light spectrum. In other embodiments, the DLP 74 is a liquid crystal display (LCD) projector. In embodiments, the DLP 74 may be a liquid crystal on silicon (LCOS) projector. In embodiments, the DLP 74 may be an analog projector (e.g. a slide film projector or a movie film projector). One of ordinary skill in the art would appreciate other types of projectors which may be used to project ultraviolet light on the substrate.

Referring again to FIG. 3, the AR-HUD 58 projects images that are perceived by the user in a far image plane 79. The environment surrounding the vehicle 10 is visible through the windshield 62 and images projected by the AR-HUD 58 are perceived by the driver overlayed onto the environment surrounding the vehicle 10.

In an exemplary embodiment, the data processor 52 is adapted to display, with the HMI 56, a list of parking preference options to a user within the vehicle 10 and to collect, from the user, parking preferences for the user for each of the options presented in the list of parking preference options. Parking preference options include preferences that are singularly preferred by the individual user, such as, by way of non-limiting examples, parking under a tree, back-in only or front-in only parking spaces, near garbage bins or cart return racks, next to handicapped access parking spaces, parking spaces with high curbs or concrete bumpers, near support columns in a parking structure, parking spaces that are near lighting at night, etc. The list of parking preferences may include a pre-populated list which may be amended by the user to include more or less preferences that the user wants the data processor to consider.

The data processor 52 receives input, via the HMI 56 of the user's preferences for each of the options listed. For example, the user preferences may indicate that the user does not want to park under or near trees, prefers front-in only parking spaces over back-in only parking spaces, prefers not to park in parking spaces where an adjacent vehicle is irregularly parked, does not like to park next to pillars or columns within a parking structure or immediately adjacent a building in a surface lot, and prefers to park directly under a light source at night. At least some of the parking preference options that are presented to the user via the HMI 56 are multi-dimensional (i.e., having at least two options that are related by a condition or having at least one fuzzy valued option).

In an exemplary embodiment, when collecting input from the user related to the user's parking preferences, the data processor 52 further receives input from the user, via the HMI 56, including a ranking for each of the options presented in the list of parking preference options, and a classification for the user's preference for each of the options presented in the list of parking preference options. The user can rank which of their preferences is more important to them. For example, the user may rank their preference of not parking under trees as their #1 preference, and rank their preference of parking near a light source at night as their #2 preference. Thus, when selecting potential parking spaces, the data processor 52 will prioritize parking spaces that are not located under a tree over parking spaces that have a light source at night, when a parking space that satisfies both preferences is not available.

Further, the data processor 52 receives classification data from the user wherein, a parking preference may be classified as a condition to avoid, a preferred condition, a required condition, or a condition that the user is not concerned about. Additionally, each parking preference option may be classified further by indicating additional conditions. For example, the user may enter a parking preference for the option of covered parking, and rank this preference, or classify this preference by indicating that this preference is "required" whenever there is precipitation or when precipitation is forecasted. Thus, if the system is looking for a parking space for the vehicle and it is raining outside, the system will only consider parking spaces that are covered, as that preference is required. Likewise, a user can classify the preference of parking near a light source as optional during the day, but required when parking at night. Each parking preference option may be classified in this way such that a particular parking preference may be optional or required depending upon another condition, such as weather, day/night, time of year, etc.

In exemplary embodiments, the data processor 52 receives parking preferences from the HMI 56 by way of input/output ports within the data processor 52. In various embodiments, the HMI 56 can include, but is not limited to, a speech system and/or a display system. As can be appreciated, in various embodiments, other HMI 56 types that receive information about a user's preferences from the user may be implemented within the vehicle 10 or may be implemented separate from the vehicle 10 and may communicate with the data processor 52 (e.g., smartphones, tablets, remote servers, etc.). The HMI 56 includes a touchscreen display 76 that allows a user to input to the data processor 52 by touching displayed icons on the touchscreen display 76.

In various embodiments, the HMI 56 is also a speech-based HMI 56 and presents preference options to a user by way of a spoken dialog and receives preference information from the user in the form of recorded user speech. The data processor 52 manages the spoken dialog generated by the speech-based HMI 56 to obtain the preference information. The spoken dialog can be managed based on the context of the dialog. The current context may be identified based on context information received from the vehicle 10 or other systems associated with the vehicle 10. The context information can be provided by, for example, other control modules in the vehicle 10 (e.g., body control modules, engine control modules transmission control modules, infotainment control modules, etc.), the plurality of sensors 40a-40n, and/or a communication bus or other communication means of the vehicle 10. The speech-based HMI 56 processes the recorded user speech to identify the preference information and provides the preference information to the data processor 52.

In various embodiments, the HMI 56 presents preference options to a user by displaying a graphical user interface on the touch screen display 76 and receives the parking preferences from the user in the form of input signals received from a user's interaction with sensors and/or switches in communication with the data processor 52. The data processor 52 manages the graphical user interface generated by the HMI 56 to obtain the preference information. The graphical user interface can be managed based on the context of the display. The current context may be identified based on context information received from the vehicle 10 or from other systems associated with the vehicle 10. The HMI 56 provides the preference information to the data processor 52. Alternatively, the HMI 56 may communicate with a personal device of the user or a mobile app, wherein, parking preferences may be communicated to the data processor 52, even when a user of the vehicle 10 is not within the vehicle 10.

The data processor 52 is further adapted to identify a current location of the vehicle 10 and a destination of the vehicle 10. The data processor 52 accesses information from in-vehicle systems, such as a navigation system to determine a final destination of the vehicle 10. The data processor 52 is also adapted to identify a current location of the vehicle 10, receiving information from a GPS system to determine the current location of the vehicle 10. The data processor 52 is also adapted to collect data from the plurality of sensors 40a-40n within the vehicle 10 to determine vehicle 10 and environmental conditions around the vehicle 10, a number of passengers within the vehicle 10 and cargo within the vehicle 10. Data related to the location of the vehicle 10, the final destination of the vehicle and the number of passengers and cargo within the vehicle is used to filter and rank potential parking spaces.

The plurality of sensors 40a-40n gather input of various vehicle conditions and data from one or more vehicle systems. Such data may include failure of system modes, operating limits of an individual vehicle system component, and reconfiguration parameters associated with vehicle systems that allow for user interface. The plurality of sensors 40a-40n also gathers environmental inputs. The plurality of sensors 40a-40n can include temperature sensors, traffic sensors, road type (e.g., highway, urban) sensors, weather (e.g., rain) sensors, occupancy sensors, occupant monitoring system 78 sensors, external cameras, internal cameras, Lidar/Radar, brake sensors, steering sensors, throttle sensors, speed sensors, vehicle switches, personal devices, HMI interactions, microphones, and the like.

As provided, the sensors 40a-40n can measure any of a wide variety of phenomena or characteristics. Sensors 40a-40n can measure, as further example, ignition position or states of the vehicle 10, whether the vehicle 10 is being turned off or on, whether or to what degree the vehicle 10 is within a distance of a location, a type of weather (e.g., rain), a level of weather (e.g., amount of rain), an outside temperature, an outside humidity, an outside wind temperature, a cabin temperature, a vehicle speed, occupancy of a seat in the vehicle 10, weight of an occupant of a seat in the vehicle 10 (e.g., to identify occupancy and distinguish between a child and adult), who is in the cabin (e.g., as identified by the presence of auxiliary devices that are specific to a user), vehicle state (e.g., amount of gas in the tank, cabin temperature, amount of oil), driver state (e.g., how long the driver has been driving and how they are driving (e.g., erratically), general conditions (e.g., weather, temperature, day, time), driving conditions (e.g., road type, traffic), and the like.

Once the data processor 52 has collected parking preferences from a user, the destination of the vehicle 10 and data related to environmental conditions at the vehicle and at the destination of the vehicle 10, the data processor 52 is further adapted to collect, via the wireless communication module 36 within the vehicle 10, data from external sources 48 and create a list of potential parking spaces. The data processor 52 collects data from external sources 48, such as sensor/ camera data from parking infrastructures and information about nearby parking availability from databases maintained by individual parking infrastructures and transportation groups, such as the Department of Transportation (DOT). In addition, the external sources 22 may include other vehicles, wherein, through crowdsourcing, information can be obtained directly from other vehicles through network communication. For example, when a vehicle leaves a parking space, it communicates that information to nearby vehicles through a vehicle-to-vehicle network to inform other vehicles of the availability of the recently vacated parking space. The data processor 52 includes a transceiver which allows the data processor 52 to communicate wirelessly with remote databases of external sources 48 over a WLAN, 4G or 5G network, or the like.

The data processor filters the list of potential parking spaces based on availability. Using data related to proximity to the final destination and if a parking structure or parking lot is open, the data processor 52 filters the list of potential parking spaces to remove parking spaces that are not at the destination and are not currently available.

The data processor 52 is then adapted to collect, via the wireless communication module 36 within the vehicle 10, and the plurality of sensors 40a-40n within the vehicle 10, data related to environmental and contextual conditions, specifically for each of the potential parking spaces, and to access a user model 80 stored within the database 54 based on historical data of parking events for the vehicle;

The user model 80 is based on historical data of past parking events for the user, the vehicle 10, or both. The user model 80 may be based on historical data of past parking events for the vehicle 10 itself, or the user model 80 may be customized for a particular driver. In such an instance, the user model 80 for a particular driver may be stored on a cloud-based database, wherein when the driver uses a particular vehicle 10, the driver's unique user model 80 is downloaded to the vehicle 10. The user model 80 is created by collecting data from past parking events and using past behavior to predict future behavior using machine learning techniques. The user model 80 contains information on the characteristics of chosen parking spaces, and other factors that contribute to the selection of a parking space. The user model 80 will predict what features are desirable in a parking space for the present conditions and based on up-to-date parking preferences for the user. A user specific user model 80 can distinguish between driving patterns for the same user based on the vehicle 10 that is being driven. For example, the user specific user model 80 would distinguish when the user is driving a vehicle 10 that the user uses exclusively for work, and when the user is driving a vehicle 10 that is used almost exclusively for traveling with the user's family. The user model 80 is created/updated by the data processor 52 and stored within the data base 54, in the case of a vehicle unique user model 80, or within a remote cloud-based data base, in the case of a driver specific user model 80. Further, the user model 80 may be stored within a mobile app on a device belonging to the user, wherein the user model 80 and the system 50 may have access to the driver's calendar, which may aid the user model 80 in predicting current preferences, such as when the calendar indicates the user is late for a meeting, thus prioritizing close/easy parking, despite cost.

The data processor 52 is then adapted to further filter the list of potential parking spaces based on user preferences entered by the user and collected by the data processor 52, data related to environmental and contextual conditions collected by the plurality of sensors 40a-40n and received via the wireless communication module 36, and the user model 80, thus creating a filtered list of potential parking spaces. For example, the parking preferences of the user indicate that a covered parking space is required when it is raining. Thus, if it is not raining, the data processor will keep uncovered parking spaces within the list of potential parking spaces. However, if data collected by the data processor 52 indicates that it is raining at the destination of the vehicle 10, then the data processor 52 will remove un-covered parking spaces from the list of potential parking spaces.

The data processor 52 then ranks the parking spaces within the filtered list of potential parking spaces based on user preferences entered by the user and collected by the data processor 52, data related to environmental and contextual conditions collected by the plurality of sensors 40a-40n and received via the wireless communication module 36, and the user model 80.

The data processor 52 is adapted to rank the potential parking spaces based on user preferences entered by the user and collected by the data processor 52, data related to environmental and contextual conditions collected by the plurality of sensors 40a-40n and received via the wireless communication module 36, and the user model 80 by assigning a value to each one of the potential parking spaces within the filtered list of potential parking spaces based on how closely each one of the potential parking spaces satisfies the parking preferences of the user. For example, according to the user model 80, whenever it is dark, the vehicle 10 parks in a parking space that is near a light source. The user model 80 will use that information to predict that the user of the vehicle 10 will prefer a lighted parking space when it is dark outside and assign a higher value to parking spaces that are near a light source whenever it is dark. In another example, the user model 80 indicates that on weekdays, when the user of the vehicle 10 is traveling alone to work in the morning, the user is generally driving a work vehicle and is less picky about parking spaces and often parks in parking spaces near/under trees, with curbs/bumpers, etc. However, on weekends, the user often drives a sports car, and is more selective about parking in parking spaces that are not near trees and do not have curbs/concrete bumpers, as the sports car has very little ground clearance. Thus, on a weekend day, based on the user model 80, the data processor 52 will assign a higher value to parking spaces that are not near trees and do not have curbs or concrete parking bumpers.

When ranking the potential parking spaces, the data processor 52 optimizes based on a perspective from the user, taking into consideration the weather, characteristics of the parking space and parking preferences of the user, distance that the user may be willing to walk and how long the vehicle will need to be parked there. The data processor 52 further optimizes based on a perspective from the vehicle 10, taking into consideration elements such as characteristics of the vehicle 10 and a vehicle-specific user model 80 for the vehicle 10. Finally, the data processor 52 further optimizes based on a perspective from the parking space, taking into consideration elements such as complexity of the parking space (structure, street, difficulty to exit, etc.), price, probability of space being empty, time allowed to park, permit requirements, and possible next tasks for the vehicle 10. For example, an autonomous vehicle may need to travel autonomously to a more distant parking space, or may need to continue on to satisfy a task, such as, taking another passenger to a different location, deliver a package to a different location, etc. Such next tasks may affect where the vehicle drops a user and the parking space ultimately selected.

A first step in ranking or scoring a list of potential parking spaces includes identifying parking spaces for which information is known to identify parking spaces that fit the priorities established by the parking preferences entered by the user and the user model 80 and are close enough to the vehicle 10 to be selected, if the space is empty. For example, when computing a score for a given parking space, $P_i$, calculate the variables:

$P_i$ location: can be mapped to a value between 0-1, where 1 represents closer parking and lower numbers represent more distant parking;

$P_i$ parking preference #1: can be mapped to a value between 0-1, where 1 represents satisfying parking preference #1 and lower numbers are for not satisfying parking preference #1; and $P_i$ parking preference #2: assume a value between 0-1, where 1 represents satisfying parking preference #2 and lower numbers are for not satisfying parking preference #2.

From the user model 80, with preferences about this parking space for current time and destination, get a probability between 0 to 1 for the user to like parking at $P_i$, then:

$$\text{score } (P_i) = \text{User value}(P_i) *$$
$$(-(\text{parking preference } \#1(P_i) + \text{parking preference } \#2(P_i))).$$

From the user model 80, get a binary value for 1, indicating that the driver would want to park at parking space $P_i$, or a value of 0 otherwise, then:

$$\text{score } (P_i) =$$
$$\text{User value}(P_i) - (\text{parking preference } \#1(P_i) + \text{parking preference } \#2(P_i)).$$

Additionally, a second step in ranking or scoring potential parking spaces includes a probabilistic analysis, wherein the data processor 52 will calculate a probability that each one of the potential parking spaces will be empty at a time when the vehicle 10 will arrive at such parking space. For example, assuming a database with parking options is available to the system 50 and that an occupancy distribution model has been computed such that for any time and date, the probability of finding an empty spot at a particular parking location can be retrieved. Using such data, the data processor 52 determines that certain parking structures are generally full or close to full during specific times, such as, during working hours for a parking structure near an office building, and during early evening hours for a parking structure near a restaurant district. When ranking the potential parking spaces, the data processor 52 calculates a probability that a parking space within a particular parking structure will be available at an estimated time of arrival. If data suggests that such a parking space has a low probability of being available, the data processor 52 will assign a lower score to such parking space. Alternatively, the data processor 52 may communicate with the parking facility to reserve a parking space, thus eliminating the probabilistic element of ranking/scoring the potential parking spaces, and allowing the system 50 to guarantee that such parking space will be empty when the vehicle 10 arrives.

In an exemplary embodiment, the HMI 56 is adapted to receive information from the user for more specific parking preferences. For example, the data processor 52, based on the user model 80, determines that the user requires a covered parking space when it is raining outside, however, there is not data or specific parking preference for the user related to snow. Thus, the data processor 52 may prompt the user through the HMI 56 with a question, such as "It is snowing, do you prefer a covered parking space?". Wherein, the user can respond, either verbally or by inputting a response on the HMI 56, with a "yes", wherein the data processor 52 will filter and rank the potential parking spaces accordingly. Further, the data processor 52 will update the user model 80 to indicate that the user prefers covered parking during rain or snow.

In another example, with an autonomous vehicle, the data processor 52 may prompt the user through the HMI 56 with a question, such as "Do you wish to be dropped off at the entrance?", wherein, if the user chooses, the vehicle 10 will proceed to the entrance of the final destination, and automatically proceed to a nearby parking spot after the user has exited the vehicle 10. Such parking spot filtered and ranked based on the fact that some parking preferences entered by the user may be less relevant due to the fact that the user will be dropped off at the entrance.

Figure 5:
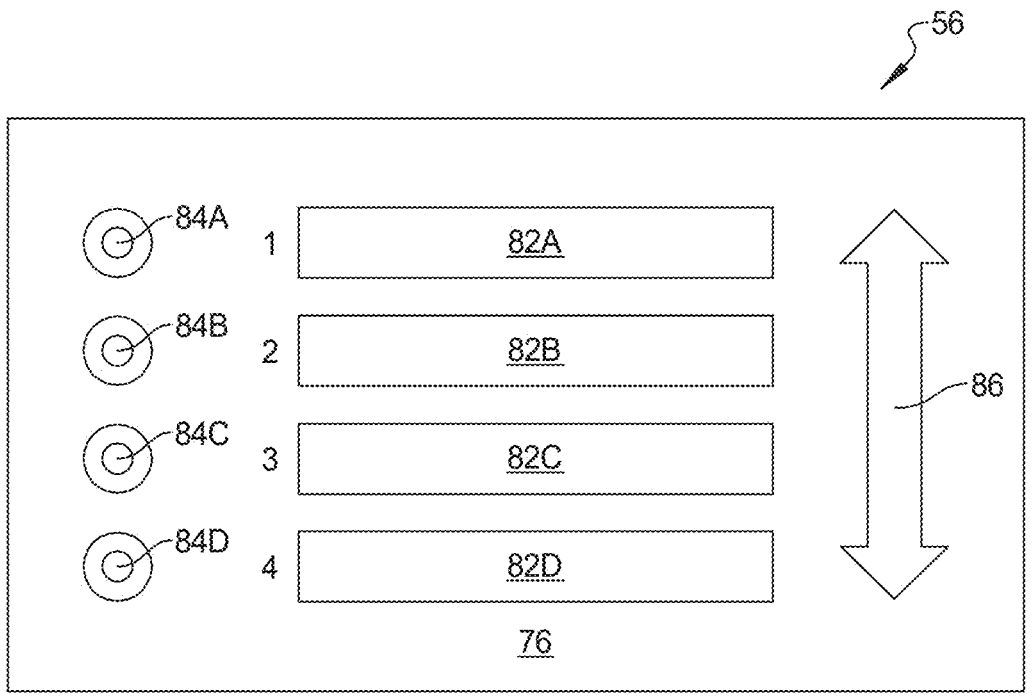
FIG. 5 is an example of a display on a human machine interface within the vehicle presenting a sub-set of ranked potential parking spaces to the user.

The data processor 52 then selects, from the filtered list of potential parking spaces, a sub-set of potential parking spaces based on rank. For example, the list of potential parking spaces may include twenty parking spaces. The data processor 52 selects a sub-set of potential parking spaces that includes the highest ranked ten parking spaces. Referring to FIG. 5, the data processor then displays, via the touch screen display 76 of the HMI 56, the sub-set of potential parking spaces to the user with an explanation for the rankings. As shown in FIG. 5, the first, second, third and fourth ranked potential parking spaces are displayed on the touch screen display 76 of the HMI 56. The list includes a description and an explanation 82A of where the first parking space is and why the first parking space was ranked #1. The list further includes an icon 84A adapted to allow the user to touch the touch screen display 76 to select the first ranked parking space. The explanation 82A may include an address for the parking space, details on location within a parking structure or parking lot, and an explanation pointing out that the first ranked parking space satisfies the user's parking preferences based on contextual information. For example, the explanation may include "Supermarket Parking Lot, Center Row, 3rd space on right side. No trees, no curbs/bumpers, no adjacent vehicles." The displayed list further includes explanations 82B, 82C, 82D and touch screen icons 84B, 84C, 84D for the second, third and fourth parking spaces included in the sub-set of potential parking spaces. The data processor 52 also displays a touchable slide-bar 86 allowing the user to scroll up and down within the sub-set of potential parking spaces to see items further down in the list (lower ranked).

Figure 6:
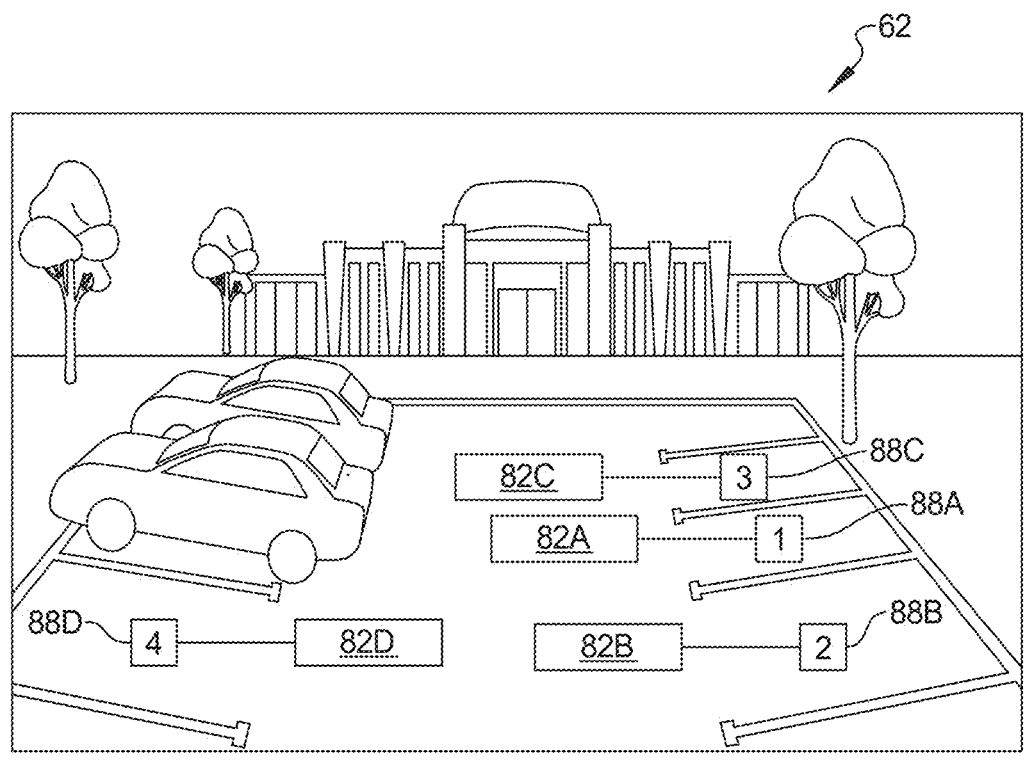
FIG. 6 is a schematic diagram of a windshield of the vehicle illustrating a parking lot visible to a user through the windshield and graphics displayed on the inner surface of the windshield by the head-up display system.

In an exemplary embodiment, when displaying, via the HMI 56, the sub-set of potential parking spaces to the user, the data processor 52 is further adapted to display, with the AR-HUD 58, upon the inner surface 60 of the windshield 62 of the vehicle 10, text and graphics adapted to identify and provide information related to the sub-set of potential parking spaces. Referring to FIG. 6, a perspective view of the inner surface 60 of the windshield 62 is shown, wherein a parking lot including several parking spaces and some parked vehicles at a supermarket is visible by a user through the windshield 62.

As shown in FIG. 6, each of the four potential parking spaces listed on the HMI 56 in FIG. 5 are highlighted with a graphic 88A, 88B, 88C, 88D displayed on the inner surface

60 of the windshield 62 to identify the potential parking spaces. Further, the explanations 82A, 82B, 82C, 82D included in the list displayed on the HMI 56 are displayed, with the AR-HUD 58 in proximity to the identification graphics 88A, 88B, 88C, 88D. The explanations included identification, location and ranking information to allow the user to determine which of the identified sub-set of parking spaces may be suitable. As shown in FIG. 6, the first ranked of the sub-set of potential parking spaces is identified by the graphic 88A as well as the explanation 82A that was displayed on the HMI 56.

For the first ranked of the sub-set of potential parking spaces the explanation 82A includes "Supermarket Parking Lot, Center Row, 3rd space on right side. No trees, no curbs/bumpers, no adjacent vehicles."

For the second ranked of the sub-set of potential parking spaces the explanation 82B includes "Supermarket Parking Lot, Center Row, 4th space on right side. No trees, no curbs/bumpers, no adjacent vehicles."

For the third ranked of the sub-set of potential parking spaces the explanation 82C includes "Supermarket Parking Lot, Center Row, 1st space on right side. Trees present. End of row. No adjacent vehicles."

For the fourth ranked of the sub-set of potential parking spaces the explanation 82D includes "Supermarket Parking Lot, Center Row, 4th space on left side. Adjacent vehicle present."

Identification of the sub-set of potential parking spaces may include numbered icons (graphics 88A, 88B, 88C, 88D) as shown in FIG. 6. Identification of the sub-set of potential parking spaces may also include highlighting, or other graphics meant to draw a user's attention to the parking space.

The AR HUD 58 projects the graphics 88A, 88B, 88C, 88D and explanations 82A, 82B, 82C, 82D upon the inner surface 60 of the windshield 62 so the graphics 88A, 88B, 88C, 88D and explanations 82A, 82B, 82C, 82D appear within the far image plane 79 overlaid at a position upon the windshield 62 where the graphics 88A, 88B, 88C, 88D and explanations 82A, 82B, 82C, 82D appear to the user to be positioned in front of the vehicle 10 in proper proximity to the identified sub-set of potential parking spaces to which the graphics 88A, 88B, 88C, 88D and explanations 82A, 82B, 82C, 82D pertain. The occupant monitoring system 78 includes sensors known in the art to approximate a location of the head of an occupant and further the orientation or gaze location of the eyes of the occupant. Based upon the output of the occupant monitoring system 78 and input data tracking location information regarding the environment around the vehicle 10, the system 50 can accurately position the graphics 88A, 88B, 88C, 88D and explanations 82A, 82B, 82C, 82D such that the occupant sees the graphics 88A, 88B, 88C, 88D and explanations 82A, 82B, 82C, 82D overlaid with visual images through the windshield 62.

The system 50 described above includes eye sensing and head sensing devices allowing estimation of eye location, allowing registration of images upon the windshield 62 such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 62 are contemplated, and the disclosure is not intended to be limited to the particular embodiments described herein.

In an exemplary embodiment, when displaying, with the AR-HUD 54, the graphics 88A, 88B, 88C, 88D and explanations 82A, 82B, 82C, 82D related to the sub-set of potential parking spaces, the system controller 34A of the AR-HUD 58 is further adapted to calculate a first location 90 within the windshield 62 based on data received from the occupant monitoring system 78, the at least one image capturing device and the at least on non-visual sensor (included within the plurality of onboard sensors 40a-40n), and to project the graphics 88A, 88B, 88C, 88D and explanations 82A, 82B, 82C, 82D upward to the first location 90, wherein the graphics 88A, 88B, 88C, 88D and explanations 82A, 82B, 82C, 82D are perceived by the user properly positioned relative to the identified parking spaces. Further, the system controller 34A continuously, on a periodic cycle, re-calculates the first location 90 based on data received from the occupant monitoring system 78, the onboard sensors 40a-40n and a position of the head an eyes 66 of the user move and as the position of the vehicle 10 relative to the identified parking spaces changes.

The data processor 52 is further adapted to receive, from the user, via the HMI 56, a selection of one of the displayed sub-set of potential parking spaces, and, at least one of: 1) initiate, via communication with the vehicle controller 34, autonomous travel to and parking within the selected one of the sub-set of potential parking spaces, and, 2) display, via the HMI 56, directions to the selected one of the sub-set of potential parking spaces.

In an exemplary embodiment, when collecting, via the HMI 56, parking preferences for the user for each of the options presented in the list of parking preference options, the data processor 52 is further adapted to collect, via the HMI 56, a preference for the data processor 52 to, when the destination for the vehicle 10 has been identified, send instructions to the vehicle controller to automatically and autonomously navigate the vehicle to a highest ranked one of the sub-set of potential parking spaces, and park the vehicle within the highest ranked one of the sub-set of potential parking spaces. Thus, the user authorizes the data processor 52 to make the selection of a parking space automatically, wherein, the data processor 52 initiates, via communication with the vehicle controller 34, autonomous travel to and parking within the selected one of the sub-set of potential parking spaces.

In an exemplary embodiment, when collecting, via the HMI 56, parking preferences for the user for each of the options presented in the list of parking preference options, the data processor 52 is further adapted to collect, via the HMI 56, a preference for the data processor 52 to, when a destination for the vehicle has been identified and a selection of one of the sub-set of potential parking spaces has been received from the user, send instructions to the vehicle controller to automatically and autonomously navigate the vehicle to the selected one of the sub-set of potential parking spaces, and park the vehicle within the selected one of the sub-set of potential parking spaces. In either instance, manual selection, via the HMI 56, of one of the displayed sub-set of potential parking spaces by the user, or automatic selection, by the data processor 52, of the highest ranked one of the sub-set of potential parking spaces, the data processor 52 initiates, via communication with the vehicle controller 34, autonomous travel to and parking within the selected one of the sub-set of potential parking spaces.

Figure 7:
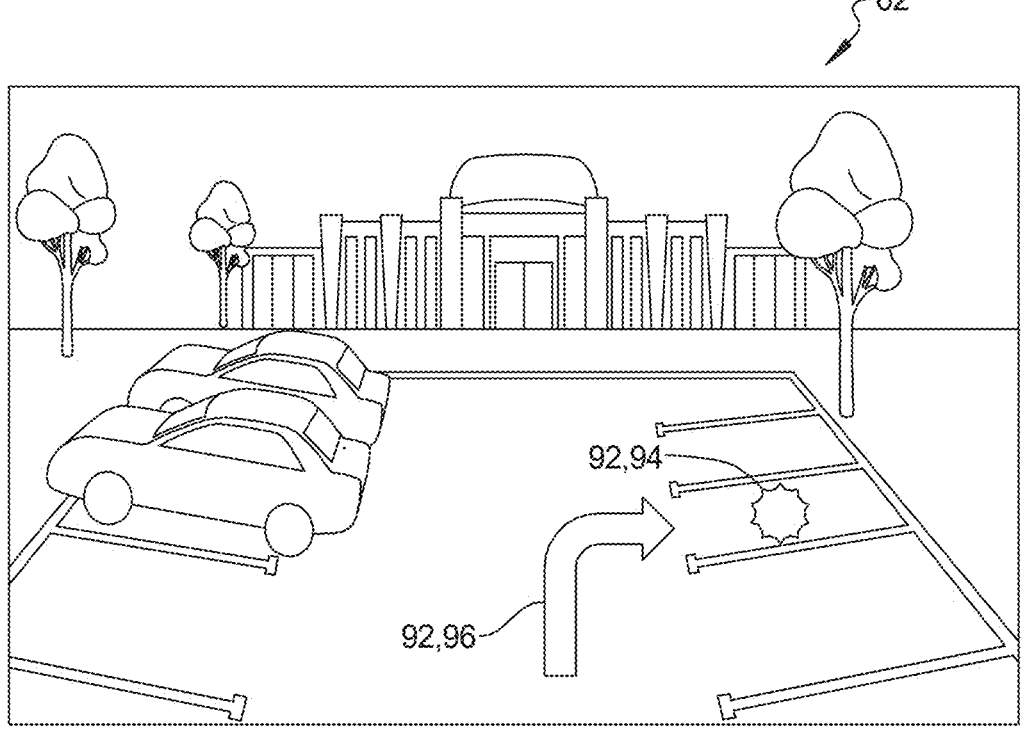
FIG. 7 is a schematic diagram of the windshield shown in FIG. 6, wherein a parking space is selected and the system displays directional graphics onto the inner surface of the windshield to guide the vehicle to the selected parking space.

Referring to FIG. 7, alternatively, when the data processor 52 receives, from the user, via the HMI 56, a selection of one of the displayed sub-set of potential parking spaces, the data processor 52 displays, via the HMI 56, directions to the selected one of the sub-set of potential parking spaces, and graphics 92 adapted to guide the user to the selected one of the sub-set of potential parking spaces. For example, if the user selects the first (#1, highest ranked) of the sub-set of potential parking spaces listed on the HMI 56, as shown and FIG. 5, and as displayed on the windshield 62, as shown in FIG. 6, the graphics 92 include an icon 94 positioned over the selected parking space and an arrow 96, directing the vehicle 10 into the selected one of the sub-set of potential parking spaces.

It should be understood that the examples cited herein are merely for description, and that the explanations 82A, 82B, 82C, 82D, graphics 88A, 88B, 88C, 88D, and graphics 92 displayed onto the inner surface 60 of the windshield 62 could include other text and/or designs adapted to provide textual and/or graphic indications to the user.

The system controller 34A of the AR-HUD 58 includes an image generation engine 98 which includes a programmable processor including programming to monitor various inputs and determine what information is appropriate to include within the explanations 82A, 82B, 82C, 82D, graphics 88A, 88B, 88C, 88D, and graphics 92 displayed onto the inner surface 60 of the windshield 62, and to generate appropriate text and/or graphics to include within the explanations 82A, 82B, 82C, 82D, graphics 88A, 88B, 88C, 88D, and graphics 92 displayed onto the inner surface 60 of the windshield 62 based on data received from the occupant monitoring system 78, the at least one image capturing device and the at least on non-visual sensor (included within the plurality of onboard sensors 40a-40n), and data received via the wireless communication module 36. The image generation engine 98 includes display software and programming for translating requests to display information into graphical representations describing the information. Further, the system controller 34A and image generation engine 98 are adapted to continuously update the explanations 82A, 82B, 82C, 82D, graphics 88A, 88B, 88C, 88D, and graphics 92 displayed onto the inner surface 60 of the windshield 62 as data related to the sub-set of potential parking spaces changes.

The image generation engine 98 can communicate directly with various systems and components, or the image generation engine 98 can alternatively or additionally communicate over a LAN/CAN system. The image generation engine 98 utilizes information regarding the operational environment of the vehicle 10 derived from a number of inputs. The various sensing devices 40a-40n collect and provide information. The sensing devices 40a-40n include a camera or image capturing device taking periodic or sequential images representing a view from the vehicle 10. The windshield 62 is equipped with features capable of displaying and/or reflecting an image projected thereupon while remaining transparent or substantially transparent such that occupants of the vehicle 10 can clearly observe outside of the vehicle 10 through the windshield 62.

The image generation engine 98 includes display software or programming translating requests to display information from the image generation engine 98 in graphical representations describing the information. The image generation engine 98 includes programming to compensate for the curved and tilted surface of the windshield 62 and any other surfaces onto which images are to be projected.

In an exemplary embodiment, the data processor 52 repeats the creating a filtered list of potential parking spaces, the ranking each of the potential parking spaces in the filtered list, the selecting, from the filtered list of potential parking spaces, a sub-set of potential parking spaces based on rank, and the displaying, via the HMI 56, the sub-set of potential parking spaces to the user at a pre-determined interval until the vehicle 10 has parked. Thus, the data processor 52 continuously gathers data and updates the sub-set of potential parking spaces until the user selects an acceptable parking space and completes parking of the vehicle 10, either manually or autonomously, therein.

In an exemplary embodiment, upon arrival of the vehicle 10 at the selected one of the sub-set of potential parking spaces, the data processor is further adapted to collect, with the plurality of sensors 40a-40n within the vehicle 10, data related to environmental and contextual conditions at the selected one of the sub-set of potential parking spaces, re-rank the list of filtered potential parking spaces and update the sub-set of potential parking spaces, and display, with the HMI 56, the updated sub-set of potential parking spaces.

Upon arrival at the selected one of the sub-set of potential parking spaces, the data processor 52 is adapted to capture, with at least one image capturing device 40a-40n in electronic communication with the data processor 52, images of the environment surrounding the selected one of the sub-set of potential parking spaces, detect, with at least one non-visual sensor 40a-40n in electronic communication with the data processor 52, objects (trees, adjacent vehicles, curbs, parking bumpers, etc.) within the environment surrounding the selected one of the sub-set of potential parking spaces. Real-time images and data collected by the data processor 52 at the location of the selected one of the sub-set of potential parking spaces may cause the content and ranking of the sub-set of potential parking spaces to change, wherein the data processor 52 displays the updated sub-set of potential parking spaces for the user.

The user can either make a selection, via the HMI 56, to continue parking in the selected one of the sub-set of potential parking spaces, or make a selection of one of the updated sub-set of potential parking spaces that the user now wishes to park within. Thus, upon arrival, the user, based on observing the actual parking space in person, can decide to make an alternative selection.

If the user elects to make a selection, via the HMI 56, to continue parking in the selected one of the sub-set of potential parking spaces, the data processor is adapted to at least one of: 1) continue, via communication with the vehicle controller 34, autonomous travel to and parking within the selected one of the sub-set of potential parking spaces, and, 2) resume display, via the HMI 56, of directions to the selected one of the sub-set of potential parking spaces, and graphics 92 adapted to guide the user to the selected one of the sub-set of potential parking spaces.

If the user elects to make a selection of one of the updated sub-set of potential parking spaces that the user now wishes to park within, the data processor 52 is adapted to at least one of: 1) initiate, via communication with the vehicle controller 34, autonomous travel to and parking within the selected one of the updated sub-set of potential parking spaces, and, 2) display, via the HMI 56, directions to the selected one of the updated sub-set of potential parking spaces, and graphics 92 adapted to guide the user to the selected one of the updated sub-set of potential parking spaces.

In another exemplary embodiment, upon arrival of the vehicle 10 at the selected one of the sub-set of potential parking spaces, the data processor 52 is further adapted to receive, from the user, via the HMI 56, a rejection of the selected one of the sub-set of potential parking spaces. The data processor, via the HMI 56 displays an icon or is adapted to receive verbal input from the user allowing the user to decide, upon arrival, that the selected one of the sub-set of potential parking spaces is unacceptable. For example, upon arrival, the user may observe that the parking space is a back-in only parking space, and the user forgot to enter a parking preference to avoid back-in only parking spaces, even though, the user does not like to park in back-in only parking spaces. Thus, upon realizing that the selected one of the sub-set of potential parking spaces is a back-in only parking space, the user may elect to reject the selected one of the sub-set of potential parking spaces.

Upon rejection, by the user, of the selected one of the sub-set of potential parking spaces, the data processor is adapted to prompt, with the HMI, an explanation for the rejection. Thus, the data processor provides an opportunity for the user to input a reason for rejecting the selected one of the sub-set of potential parking spaces. Here, the user would input that back-in only parking is the reason for rejecting the parking space, wherein, the data processor updates the user model 80 based on rejection of the selected one of the sub-set of potential parking spaces and the explanation provided by the user. Thus, the user model 80 will reflect the user's preference related to back-in only parking spaces in general, and further, will reflect the user's rejection of the selected one of the sub-set of potential parking spaces specifically, for reference when selecting and ranking potential parking spaces in the future.

In an exemplary embodiment, the data processor 52 is further adapted to collect, via the wireless communication module 36 within the vehicle 10, data from external sources 48 related to availability of parking spaces within a parking structure (surface parking lot, parking ramp) at the identified destination, and determine, based on the user model 80 if the identified destination is familiar to the user or unfamiliar to the user. For example, if the destination is the parking lot at the user's place of work, the user model 80 will determine that the user goes to that parking lot on a regular basis, year around, and the user is likely very familiar with the parking lot. Thus, the system 50 will only display a sub-set of potential parking spaces to the user when the number of available parking spaces at the parking structure at the destination is less than a first pre-determined threshold. Since the user is familiar with the parking lot at the destination, the system 50 will only provide parking optimization assistance to the user when the number of available parking spaces at the parking lot is low, by way of non-limiting example, less than 10%. If availability is more than 10%, the user will likely, due to familiarity with the parking lot, easily find a suitable parking space that meets the parking preferences of the user, and will not need assistance from the system 50.

In another example, if the destination is a parking ramp at an amusement park that the user has only visited one other time previously, the user model 80 will determine that the user is likely unfamiliar with the parking lot and features of the parking spaces therein. Thus, the system 50 will only display a sub-set of potential parking spaces to the user when the number of available parking spaces at the parking structure at the destination is less than a second pre-determined threshold. Since the user is unfamiliar with the parking lot at the destination, the system 50 will only provide parking optimization assistance to the user when the number of available parking spaces at the parking lot is moderately low, by way of non-limiting example, less than 50%. If availability is more than 50%, even though the user is unfamiliar with the parking lot, the user will likely be able to identify a suitable parking space that meets the parking preferences of the user, and will not need assistance from the system 50.

Thus, the system 50, based on familiarity of the user with parking at an identified destination can selectively engage with the user, avoiding potentially annoying and distracting interaction when such interaction with the user is unnecessary.

In another exemplary embodiment, the data processor 52 is further adapted to updated the user model 80 based on inputs, from the user, collected by the data processor 52, via the HMI 56, selection, by the user, of one of the sub-set of potential parking spaces, rejection, by the user, of a selected one of the sub-set of potential parking spaces, and completion of parking within the selected one of the sub-set of potential parking spaces. This keeps the user model 80 updated to evolving/changing user parking preferences and preferences applicable to specific parking spaces in light of environmental and contextual factors.

Figure 8:
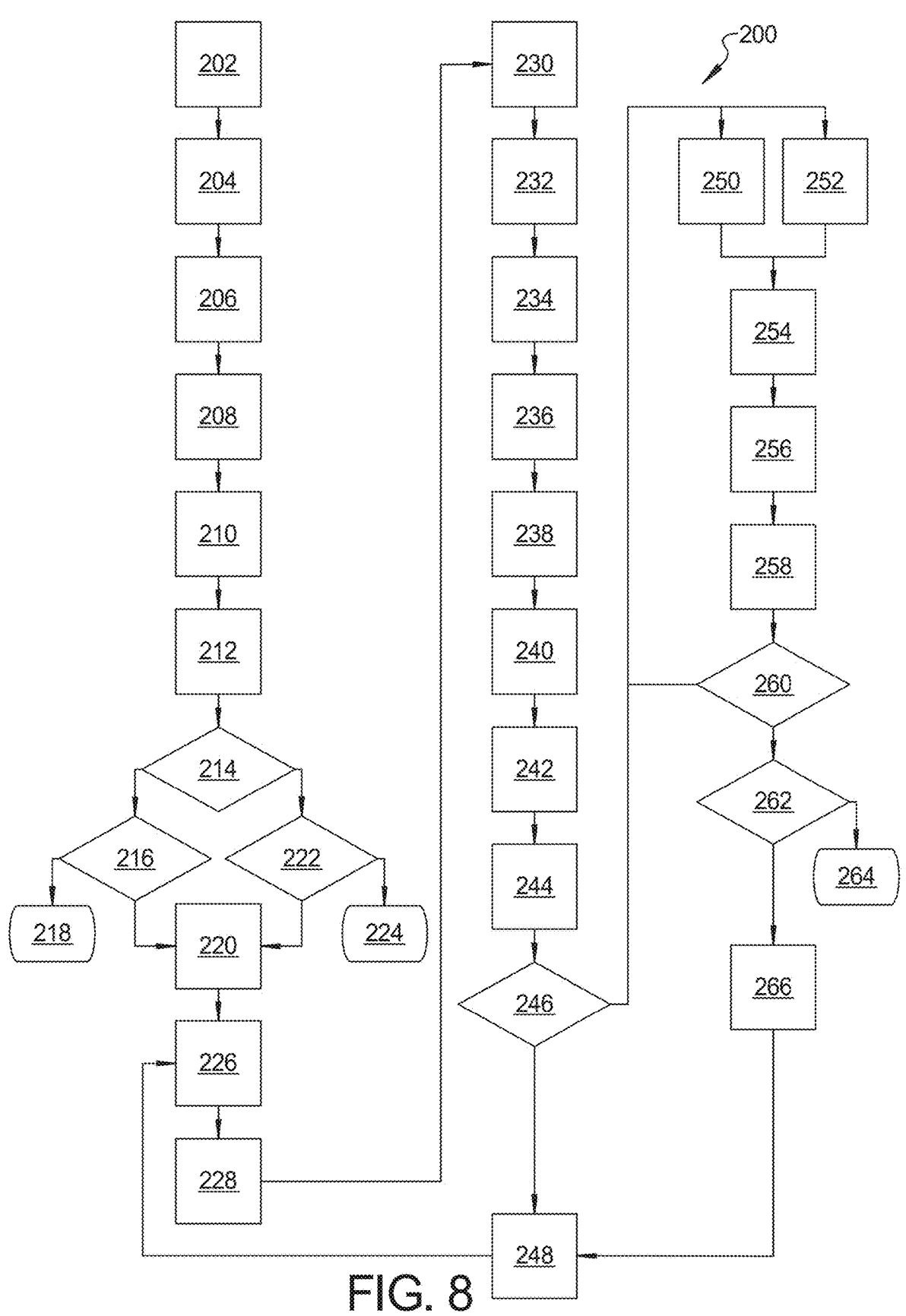
FIG. 8 is a flow chart illustrating a method of operating the system of FIG. 1.

Referring to FIG. 8, a flowchart illustrating a method 200 of selecting an optimized parking location for a vehicle 10 is shown. Beginning at block 202, the method 200 includes presenting, via a human machine interface (HMI) 56, a list of parking preference options to a user within the vehicle 10, moving to block 204, collecting, via the HMI 56, parking preferences for the user for each of the options presented in the list of parking preference options, moving to block 206, identifying a destination of the vehicle 10, moving to block 208, identifying a current location of the vehicle, and, moving to block 210, collecting data from a plurality of sensors 40a-40n within the vehicle 10 related to a number of passengers within the vehicle 10 and cargo within the vehicle 10.

In an exemplary embodiment, the method 200 includes, moving to block 212, collecting, via the wireless communication module 36 within the vehicle 10, data from external sources 48 related to availability of parking spaces within a parking structure at the identified destination, and, moving to block 214, determining if the identified destination is familiar to the user or unfamiliar to the user.

Wherein if, at block 214, the data processor 52 determines that the identified destination is, based on the user model 80, familiar to the user, then, using the data from external sources 48, moving to block 216, the data processor 52 determines if the number of available parking spaces at the parking structure at the destination is less than a first predetermined threshold. If, at block 216, the data processor 52 determines that the number of available parking spaces at the parking structure at the destination is not less than the first predetermined threshold, for example, 10%, then, moving to block 218, the method 200 ends, and the data processor 52 takes no further action. If, at block 216, the data processor 52 determines that the number of available parking spaces at the parking structure at the destination is less than the first predetermined threshold of 10%, then, the method 200 proceeds to block 220.

If, at block 214, the data processor 52 determines that the identified destination is, based on the user model 80, unfamiliar to the user, then, using the data from external sources

48, moving to block 222, the data processor 52 determines if the number of available parking spaces at the parking structure at the destination is less than a second predetermined threshold. If, at block 222, the data processor 52 determines that the number of available parking spaces at the parking structure at the destination is not less than the second predetermined threshold, for example, 50%, then, moving to block 224, the method 200 ends, and the data processor 52 takes no further action. If, at block 222, the data processor 52 determines that the number of available parking spaces at the parking structure at the destination is less than the second predetermined threshold of 50%, then, the method 200 proceeds to block 220.

At block 220, the method 200 further includes collecting, via a wireless communication module 36 within the vehicle 10, data from external sources 48 and, moving to block 226, creating a list of potential parking spaces, moving to block 228, filtering the list of potential parking spaces based on availability, moving to block 230, collecting, via the wireless communication module 36 within the vehicle 10, and sensors 40a-40n within the vehicle 10, data related to environmental and contextual conditions for each of the potential parking spaces, moving to block 232, accessing, with the data processor 52, a user model 80 based on historical data of parking events for the vehicle 10, moving to block 234, further filtering the list of potential parking spaces based on user preferences, data related to environmental and contextual conditions, and the user model 80 and, moving to block 236, creating a filtered list of potential parking spaces.

Moving to block 238, the method 200 includes ranking each of the potential parking spaces in the filtered list based on the parking preferences of the user, the data related to environmental and contextual conditions, and the user model 80, moving to block 240, selecting, from the filtered list of potential parking spaces, a sub-set of potential parking spaces based on rank, moving to block 242, displaying, via the HMI 56, the sub-set of potential parking spaces to the user, and, moving to block 244, receiving, from the user, via the HMI 56, a selection of one of the displayed sub-set of potential parking spaces.

If, at block 246, the data processor 52 has not received a selection of one of the displayed sub-set of potential parking spaces, then, moving to block 248, the data processor 52 updates the user model 80 based on environmental and contextual conditions and the fact that the user did not select any of the displayed sub-set of potential parking spaces.

If, at block 246, the data processor 52 receives, from the user, via the HMI 56, a selection of one of the displayed sub-set of potential parking spaces, then, the method 200 moves on to at least one of, moving to block 250, initiating, via communication with the vehicle controller 34, autonomous travel to and parking within the selected one of the sub-set of potential parking spaces, and, moving to block 252, displaying, via the HMI 56, directions to the selected one of the sub-set of potential parking spaces.

In an exemplary embodiment, the method 200 further includes, upon arrival of the vehicle 10 at the selected one of the sub-set of potential parking spaces, moving to block 254, collecting, with the sensors 40a-40n within the vehicle 10, data related to environmental and contextual conditions at the selected one of the sub-set of potential parking spaces, moving to block 256, re-ranking the list of filtered potential parking spaces and updating the sub-set of potential parking spaces, and, moving to block 258, displaying, with the HMI 56, the updated sub-set of potential parking spaces.

Moving to block 260, if the data processor 52 receives, via the HMI 56, a selection of one of the displayed updated sub-set of potential parking spaces that the user now wishes to park within, then the method 200 reverts back to at least one of, moving to block 250, initiating, via communication with the vehicle controller 34, autonomous travel to and parking within the selected one of the sub-set of potential parking spaces, and, moving to block 252, displaying, via the HMI 56, directions to the selected one of the sub-set of potential parking spaces.

If, at block 260, the data processor 52 receives, via the HMI 56, a selection, by the user, to continue parking in the selected one of the sub-set of potential parking spaces, then, the method 200 proceeds to block 262, wherein the data processor 52 provides the opportunity for the user to reject the selected one of the sub-set of potential parking spaces. If at block 262, the user does not reject the selected one of the sub-set of potential parking spaces and completes parking of the vehicle within the selected one of the sub-set of potential parking spaces, then the method 200 ends at block 264 and the data processor takes no further action.

If at block 262, the user does reject the selected one of the sub-set of potential parking spaces, the method 200 includes, moving to block 266, prompting, with the HMI 56, an explanation for the rejection, and, moving to block 248, updating the user model 80 based on rejection of the selected one of the sub-set of potential parking spaces and the explanation provided by the user.

In an exemplary embodiment, the collecting, with the data processor, via the HMI, parking preferences for the user for each of the options presented in the list of parking preference options at block 204 further includes collecting, with the data processor, via the HMI a ranking for each of the options presented in the list of parking preference options, and a classification for the user's preference for each of the options presented in the list of parking preference options.

In another exemplary embodiment, the displaying, via the HMI 56, the sub-set of potential parking spaces to the user at block 242 further includes displaying, with a hybrid head-up-display system 58, upon an inner surface 60 of a windshield 62 of the vehicle 10, text and graphics adapted to identify and provide information related to the sub-set of potential parking spaces.

In another exemplary embodiment, the collecting, via the HMI, parking preferences for the user for each of the options presented in the list of parking preference options at block 204 further includes receiving, from the user, via the HMI 56, a preference for the data processor 52 to, when a destination for the vehicle 10 has been identified, send instructions to the vehicle controller 34 to automatically and autonomously navigate the vehicle to a highest ranked one of the sub-set of potential parking spaces, and park the vehicle 10 within the highest ranked one of the sub-set of potential parking spaces.

In another exemplary embodiment, the collecting, via the HMI 56, parking preferences for the user for each of the options presented in the list of parking preference options at block 204 further includes receiving, from the user, via the HMI 56, a preference for the data processor 52 to, when a destination for the vehicle 10 has been identified and a selection of one of the sub-set of potential parking spaces has been received from the user, send instructions to the vehicle controller 34 to automatically and autonomously navigate the vehicle 10 to the selected one of the sub-set of potential parking spaces, and park the vehicle 10 within the selected one of the sub-set of potential parking spaces.

In another exemplary embodiment, the displaying, via the HMI 56, the sub-set of potential parking spaces to the user at block 242 further includes displaying, with at least one of the HMI 56 and the hybrid head-up-display system 58, explanations for the ranking of each of the displayed sub-set of potential parking spaces.

In another exemplary embodiment, the displaying, with at least one of the HMI 56 and the hybrid head-up-display system 58, explanations for the ranking of each of the displayed sub-set of potential parking spaces further includes displaying a comparison of parking characteristics of each of the sub-set of potential parking spaces to user preferences.

In another exemplary embodiment, the method 200 includes updating, with the data processor 52, the user model 80 based on Inputs, from the user, collected by the data processor 52, via the HMI 56, selection, by the user, of one of the sub-set of potential parking spaces, rejection, by the user, of a selected one of the sub-set of potential parking spaces by a user, and completion of parking within the selected one of the sub-set of potential parking spaces.

In another exemplary embodiment, the method 200 includes repeating the steps of creating the filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle 10 has parked.

A system 50 and method 200 of the present disclosure offers the advantage of selecting an optimal parking space by adapting selection of a parking space to a drivers' preferences and contextual information, interacting with the driver regarding the selection of parking spaces, and explaining the reasoning behind parking space selections. This allows the system 50 to display on and HMI 56 and with an AR-HUD 58 a filtered sub-set of potential parking spaces that is optimized, rather than displaying all potential parking spaces that meet basic requirements. This reduces clutter on the windshield. The system 50 and method 20 further provides selection of parking spaces based on user specific parking preferences, such as when a user wishes to only park in parking spaces that are right turn in, and does not want to park in spaces that are left turn in. The system, taking characteristics of the vehicle and machine learning based on a user model can avoid parking spaces that a user does not want to park in when driving a specific vehicle, such as avoiding parking spaces with curbs and concrete parking bumpers when driving a sports car with low ground clearance. The system 50 and method 200 allows a user to avoid parking spaces that are adjacent other vehicle, or more specifically, parking spaces that are adjacent other vehicles that are parked irregularly within their own parking space, as detected by vehicle sensors 40*a*-40*n*. Additionally, the system 50 can operate only when certain conditions are met, for example, only when the parking availability is less than a predetermined threshold, the threshold depending on the user's familiarity with the parking lot and parking spaces therein. This avoids running of the system 50 and potentially distracting displays and notifications, when such displays and notifications are not necessary for that user when parking at that specific parking lot or structure. The system and method further allows the user's parking preferences to be multi-dimensional, for example, the parking preferences can be premised on and "always" or "never" basis and can depend on secondary conditions, such as time of day, weather conditions, etc. This provides fine detail customization of the users parking preferences to ensure a higher level of user satisfaction when using the system and when driving the vehicle. Finally, the system 50 and method of the present disclosure provides output to the user in the form of potential parking spaces that is fine tuned specifically for the user's parking preferences, allowing manual or autonomous parking of the vehicle in parking spaces that are safe for the user and for the vehicle. Particularly in autonomous vehicles, the system 50 and method 200 of the present disclosure provides useful assistance in selection of and parking within selected parking spaces that is a significant improvement over previous systems that merely identify potential parking spaces based on simple one-dimensional preferences.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of selecting an optimized parking location for a vehicle, comprising, with a data processor of a system for selecting an optimized parking location within the vehicle:

presenting, via a human machine interface (HMI), a list of parking preference options to a user within the vehicle;

collecting, via the HMI, parking preferences for the user for each of the options presented in the list of parking preference options;

identifying a destination of the vehicle;

identifying a current location of the vehicle;

collecting data from a plurality of sensors within the vehicle related to a number of passengers within the vehicle and cargo within the vehicle;

collecting, via a wireless communication module within the vehicle, data from external sources and creating a list of potential parking spaces;

filtering the list of potential parking spaces based on availability;

collecting, via the wireless communication module within the vehicle, and sensors within the vehicle, data related to environmental and contextual conditions for each of the potential parking spaces;

accessing, with the data processor, a user model based on historical data of parking events for the vehicle;

further filtering the list of potential parking spaces based on user preferences, data related to environmental and contextual conditions, and the user model and creating a filtered list of potential parking spaces;

ranking each of the potential parking spaces in the filtered list based on the parking preferences of the driver, the data related to environmental and contextual conditions, and the user model;

selecting, from the filtered list of potential parking spaces, a sub-set of potential parking spaces based on rank;

displaying, via the HMI, the sub-set of potential parking spaces to the user;

receiving, from the user, via the HMI, a selection of one of the displayed sub-set of potential parking spaces; and at least one of:

initiating, via communication with a vehicle controller, autonomous travel to and parking within the selected one of the sub-set of potential parking spaces;

displaying, via the HMI, directions to the selected one of the sub-set of potential parking spaces; and collecting, via the wireless communication module within the vehicle, data from external sources related to availability of parking spaces within a parking structure at the identified destination; and one of:

determining, with the data processor, based on the user model, that the identified destination is familiar to the user, and displaying a sub-set of potential parking spaces to the user only when the number of available parking spaces at the parking structure at the destination is less than a first pre-determined threshold; or determining, with the data processor, based on the user model, that the identified destination is un-familiar to the user, and displaying a sub-set of potential parking spaces to the user only when the number of available parking spaces at the parking structure at the destination is less than a second pre-determined threshold.

2. The method of claim 1, further including, upon arrival of the vehicle at the selected one of the sub-set of potential parking spaces:

collecting, with the sensors within the vehicle, data related to environmental and contextual conditions at the selected one of the sub-set of potential parking spaces;

re-ranking the list of filtered potential parking spaces and updating the sub-set of potential parking spaces;

displaying, with the HMI, the updated sub-set of potential parking spaces; and receiving, from the user, via the HMI, one of:

a selection, by the user, to continue parking in the selected one of the sub-set of potential parking spaces; or a selection, of one of the displayed updated sub-set of potential parking spaces that the user now wishes to park within; and at least one of:

initiating, via communication with a vehicle controller, autonomous travel to and parking within the selected one of the updated sub-set of potential parking spaces; and displaying, via the HMI, directions to the selected one of the updated sub-set of potential parking spaces.

3. The method of claim 2, further including, upon arrival of the vehicle at the selected one of the sub-set of potential parking spaces:

receiving, from the user, via the HMI, a rejection of the selected one of the sub-set of potential parking spaces;

prompting, with the HMI, an explanation for the rejection; and updating the user model based on rejection of the selected one of the sub-set of potential parking spaces and the explanation provided by the user.

4. The method of claim 3, wherein the collecting, with the data processor, via the HMI, parking preferences for the user for each of the options presented in the list of parking preference options further includes collecting, with the data processor, via the HMI:

a ranking for each of the options presented in the list of parking preference options; and a classification for the user's preference for each of the options presented in the list of parking preference options.

5. The method of claim 4, wherein the displaying, via the HMI, the sub-set of potential parking spaces to the user further includes displaying, with a hybrid head-up-display system, upon an inner surface of a windshield of the vehicle, text and graphics adapted to identify and provide information related to the sub-set of potential parking spaces.

6. The method of claim 5, wherein the collecting, via the HMI, parking preferences for the user for each of the options presented in the list of parking preference options further includes:

receiving, from the user, via the HMI, a preference for the data processor to, when a destination for the vehicle has been identified, send instructions to the vehicle controller to automatically and autonomously:

navigate the vehicle to a highest ranked one of the sub-set of potential parking spaces; and park the vehicle within the highest ranked one of the sub-set of potential parking spaces.

7. The method of claim 5, wherein the collecting, via the HMI, parking preferences for the user for each of the options presented in the list of parking preference options further includes:

receiving, from the user, via the HMI, a preference for the data processor to, when a destination for the vehicle has been identified and a selection of one of the sub-set of potential parking spaces has been received from the user, send instructions to the vehicle controller to automatically and autonomously:

navigate the vehicle to the selected one of the sub-set of potential parking spaces; and park the vehicle within the selected one of the sub-set of potential parking spaces.

8. The method of claim 5, wherein the displaying, via the HMI, the sub-set of potential parking spaces to the user further includes displaying, with at least one of the HMI and the hybrid head-up-display system, explanations for the ranking of each of the displayed sub-set of potential parking spaces.

9. The method of claim 8, wherein the displaying, with at least one of the HMI and the hybrid head-up-display system, explanations for the ranking of each of the displayed sub-set of potential parking spaces further includes displaying a comparison of parking characteristics of each of the sub-set of potential parking spaces to user preferences.

10. The method of claim 1, wherein the determining, with the data processor, based on the user model, that the identified destination is familiar to the user, and displaying a sub-set of potential parking spaces to the user only when the number of available parking spaces at the parking structure at the destination is less than a first pre-determined threshold further includes displaying a sub-set of potential parking spaces to the user only when the number of available parking spaces at the parking structure at the destination is less than ten percent; and the determining, with the data processor, based on the user model, that the identified destination is un-familiar to the user, and displaying a sub-set of potential parking spaces to the user only when the number of available parking spaces at the parking structure at the destination is less than a second pre-determined threshold further includes displaying a sub-set of potential parking spaces to the user only when the number of available parking spaces at the parking structure at the destination is less than fifty percent.

11. The method of claim 1, further including, updating, with the data processor, the user model based on:

inputs, from the user, collected by the data processor, via the HMI;

selection, by the user, of one of the sub-set of potential parking spaces;

rejection, by the user, of a selected one of the sub-set of potential parking spaces by a user; and completion of parking within the selected one of the sub-set of potential parking spaces.

12. The method of claim 1, further including, repeating the creating a filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle has parked.

13. A system for selecting an optimized parking location for a vehicle, comprising:

a data processor adapted to control the system;

a human machine interface (HMI) adapted to present a list of parking preference options to a user within the vehicle and to collect, from the user, parking preferences for the user for each of the options presented in the list of parking preference options;

the data processor further adapted to:

identifying a destination of the vehicle;

identifying a current location of the vehicle;

collect data from a plurality of sensors within the vehicle related to a number of passengers within the vehicle and cargo within the vehicle;

collect, via a wireless communication module within the vehicle, data from external sources and create a list of potential parking spaces;

filter the list of potential parking spaces based on availability;

collect, via the wireless communication module within the vehicle, and the plurality of sensors within the vehicle, data related to environmental and contextual conditions for each of the potential parking spaces;

access a user model based on historical data of parking events for the vehicle;

further filter the list of potential parking spaces based on user preferences, data related to environmental and contextual conditions, and the user model and creating a filtered list of potential parking spaces;

rank each of the potential parking spaces in the filtered list based on the parking preferences of the driver, the data related to environmental and contextual conditions, and the user model;

select, from the filtered list of potential parking spaces, a sub-set of potential parking spaces based on rank;

display, via the HMI, the sub-set of potential parking spaces to the user with an explanation for the rankings;

receive, from the user, via the HMI, a selection of one of the displayed sub-set of potential parking spaces; and at least one of:

initiate, via communication with a vehicle controller, autonomous travel to and parking within the selected one of the sub-set of potential parking spaces; and display, via the HMI, directions to the selected one of the sub-set of potential parking spaces;

repeat the creating a filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle has parked;

collect, via the wireless communication module within the vehicle, data from external sources related to availability of parking spaces within a parking structure at the identified destination; and one of:

determine, based on the user model, that the identified destination is familiar to the user, and display a sub-set of potential parking spaces to the user only when the number of available parking spaces at the parking structure at the destination is less than a first pre-determined threshold; or determine, based on the user model, that the identified destination is un-familiar to the user, and display a sub-set of potential parking spaces to the user only when the number of available parking spaces at the parking structure at the destination is less than a second pre-determined threshold.

14. The system of claim 13, wherein, upon arrival of the vehicle at the selected one of the sub-set of potential parking spaces, the data processor is further adapted to:

collect, with the plurality of sensors within the vehicle, data related to environmental and contextual conditions at the selected one of the sub-set of potential parking spaces;

re-rank the list of filtered potential parking spaces and update the sub-set of potential parking spaces;

display, with the HMI, the updated sub-set of potential parking spaces; and receive, from the user, via the HMI, one of:

a selection, by the user, to continue parking in the selected one of the sub-set of potential parking spaces; or a selection, by the user, of one of the displayed updated sub-set of potential parking spaces that the user now wishes to park within; and at least one of:

initiate, via communication with the vehicle controller, autonomous travel to and parking within the selected one of the updated sub-set of potential parking spaces; and display, via the HMI, directions to the selected one of the updated sub-set of potential parking spaces.

15. The system of claim 14, wherein, upon arrival of the vehicle at the selected one of the sub-set of potential parking spaces, the data processor is further adapted to:

receive, from the user, via the HMI, a rejection of the selected one of the sub-set of potential parking spaces;

prompt, with the HMI, an explanation for the rejection; and update the user model based on rejection of the selected one of the sub-set of potential parking spaces and the explanation provided by the user.

16. The system of claim 15, wherein when collecting, via the HMI, parking preferences for the user for each of the options presented in the list of parking preference options, the data processor is further adapted to collect, with the data processor, via the HMI:

a ranking for each of the options presented in the list of parking preference options; and a classification for the user's preference for each of the options presented in the list of parking preference options; and a preference for the data processor to one of:

when a destination for the vehicle has been identified, send instructions to the vehicle controller to automatically and autonomously navigate the vehicle to a highest ranked one of the sub-set of potential parking spaces, and park the vehicle within the highest ranked one of the sub-set of potential parking spaces; or when a destination for the vehicle has been identified and a selection of one of the sub-set of potential parking spaces has been received from the user, send instructions to the vehicle controller to automatically and autonomously navigate the vehicle to the selected one of the sub-set of potential parking spaces, and park the vehicle within the selected one of the sub-set of potential parking spaces.

17. The system of claim 16, wherein when displaying, via the HMI, the sub-set of potential parking spaces to the user, the data processor is further adapted to display, with a hybrid head-up-display system, upon an inner surface of a windshield of the vehicle, text and graphics adapted to identify and provide information related to the sub-set of potential parking spaces.

18. The system of claim 13, wherein the data processor is further adapted to:

display a sub-set of potential parking spaces to the user only when the number of available parking spaces at the parking structure at the destination is less than ten percent; and display a sub-set of potential parking spaces to the user only when the number of available parking spaces at the parking structure at the destination is less than fifty percent.

19. The system of claim 13, wherein the data processor is further adapted to updated the user model based on:

inputs, from the user, collected by the data processor, via the HMI;

selection, by the user, of one of the sub-set of potential parking spaces;

rejection, by the user, of a selected one of the sub-set of potential parking spaces by a user; and completion of parking within the selected one of the sub-set of potential parking spaces.

20. A vehicle having a system for selecting an optimized parking location for the vehicle, comprising:

a data processor adapted to control the system; and a human machine interface (HMI) adapted to present a list of parking preference options to a user within the vehicle and to collect, from the user, parking preferences for the user for each of the options presented in the list of parking preference options;

the data processor further adapted to:

identifying a destination of the vehicle;

identifying a current location of the vehicle;

collect data from a plurality of sensors within the vehicle related to a number of passengers within the vehicle and cargo within the vehicle;

collect, via a wireless communication module within the vehicle, data from external sources and create a list of potential parking spaces;

filter the list of potential parking spaces based on availability;

collect, via the wireless communication module within the vehicle, and the plurality of sensors within the vehicle, data related to environmental and contextual conditions for each of the potential parking spaces;

access a user model based on historical data of parking events for the vehicle;

further filter the list of potential parking spaces based on user preferences, data related to environmental and contextual conditions, and the user model and creating a filtered list of potential parking spaces;

rank each of the potential parking spaces in the filtered list based on the parking preferences of the driver, the data related to environmental and contextual conditions, and the user model;

select, from the filtered list of potential parking spaces, a sub-set of potential parking spaces based on rank;

display, via the HMI, the sub-set of potential parking spaces to the user with an explanation for the rankings;

receive, from the user, via the HMI, a selection of one of the displayed sub-set of potential parking spaces; and at least one of:

initiate, via communication with a vehicle controller, autonomous travel to and parking within the selected one of the sub-set of potential parking spaces; and display, via the HMI, directions to the selected one of the sub-set of potential parking spaces;

repeat the creating a filtered list of potential parking spaces, the ranking each of the potential parking spaces in the filtered list, the selecting, from the filtered list of potential parking spaces, a sub-set of potential parking spaces based on rank, and the displaying, via the HMI, the sub-set of potential parking spaces to the user at a pre-determined interval until the vehicle has parked;

collect, via the wireless communication module within the vehicle, data from external sources related to availability of parking spaces within a parking structure at the identified destination; and one of:

determine, based on the user model, that the identified destination is familiar to the user, and display a sub-set of potential parking spaces to the user only when the number of available parking spaces at the parking structure at the destination is less than a first pre-determined threshold; or determine, based on the user model, that the identified destination is un-familiar to the user, and display a sub-set of potential parking spaces to the user only when the number of available parking spaces at the parking structure at the destination is less than a second pre-determined threshold.

\* \* \* \* \*